United States Patent [19]

Ishida

[11] Patent Number: 5,303,337
[45] Date of Patent: Apr. 12, 1994

[54] METHOD AND DEVICE FOR DETERMINING A VIEWING PERSPECTIVE FOR IMAGE PRODUCTION

[75] Inventor: Tomotoshi Ishida, Katsuta, Japan
[73] Assignee: Hitachi, Ltd., Tokyo, Japan
[21] Appl. No.: 659,718
[22] Filed: Feb. 25, 1991
[30] Foreign Application Priority Data Feb. 28, 1990 [JP] Japan .................. 2-045563

[51] Int. Cl.$^5$ .................. G06F 15/72; G06F 15/60
[52] U.S. Cl. .................. 395/119; 395/127; 395/137; 395/161
[58] Field of Search .............. 395/119, 127, 137, 161, 395/157; 340/729; 364/474.24, 474.22

[56] References Cited

U.S. PATENT DOCUMENTS

| | | | |
|---|---|---|---|
| 4,754,269 | 6/1988 | Kishi et al. | 395/127 X |
| 4,845,643 | 7/1989 | Clapp | 395/127 |
| 4,855,939 | 8/1989 | Fitzgerald, Jr. et al. | 395/119 |
| 4,987,527 | 1/1991 | Hamada et al. | 395/127 X |
| 5,019,809 | 5/1991 | Chen | 340/729 X |
| 5,019,961 | 5/1991 | Addesso et al. | 395/161 X |
| 5,124,693 | 6/1992 | Himelstein et al. | 395/119 X |

FOREIGN PATENT DOCUMENTS

| | | |
|---|---|---|
| 0451875 | 10/1991 | European Pat. Off. |
| 2634922 | 2/1990 | France . |
| 46565 | 3/1986 | Japan . |
| 305475 | 12/1989 | Japan . |

OTHER PUBLICATIONS

"HITAC Program Product GRADAS Three-Dimensional Design System HICAD/3D Principles of Operation" (8090-7-034-40), 1988, pp. 150, 154, 155 (Japanese Language Literature).

Primary Examiner—Raymond J. Bayerl
Attorney, Agent, or Firm—Antonelli, Terry, Stout & Kraus

[57] ABSTRACT

An image display method and an image display system in which, based on a relative positional relationship between a three-dimensional image displayed on an image screen and an optional position designated by an operator on said image screen, the three-dimensional image is displayed after being rotated by a predetermined angle with respect to the relative positional relationship. An image is obtained by rotating the three-dimensional image by 90 degrees around a line which is orthogonal to a line connecting a center position of the three-dimensional image displayed on the image screen with the optional point designated by the operator on the image screen, thereby making it possible to designate a display perspective of a design object with operating sense which conforms with the design intent of the designer.

10 Claims, 10 Drawing Sheets

METHOD AND DEVICE FOR DETERMINING A VIEWING PERSPECTIVE FOR IMAGE PRODUCTION

BACKGROUND OF THE INVENTION

The present invention relates to an image display method and an image display system in case of designing a three-dimensional configuration and the like.

When a three-dimensional configuration is displayed with a CAD system and so on, an operator judges the quality of the configuration, watching the three-dimensional configuration from an optional direction and performs a combining operation of various configurations. This is for forecasting and judging workmanship of an object to be designed or to design objects only by data processing with a computer without actually producing the object, and for producing configuration information of the object to be designed. Further, in order to forecast in advance, when an operation command is given to a machine tool, a robot and the like, how they are operated and to what extent they interfere with other members, it is required to observe raw materials, tools, parts, arms and the like on a computer image plane.

When it has been desired to display a three-dimensional image on an image screen from a certain other point of view, for example, when a certain object being displayed is desired to be viewed from the right side or from the left side, the viewing direction has been heretofore designated as follows.

For example, in a most fundamental first prior art, the direction is designated by numeric values. That is, a directional vector line of sight and a vector in an upward direction on an image screen are designated with numeric values and an angle of rotation from a reference direction is designated with numeric values in an ordinate system in a three-dimensional space.

In a second prior art, the viewing direction is selected by having numerals correspond to several display directions which have been prepared in advance (for example, "1" corresponds to the direction viewed from the front, "2" corresponds to the direction viewed from the right and so on), and designating the corresponding numeral to a particular direction. That which is related to this second prior art is described in a manual "HITAC Program Product GRADAS Three-Dimensional Design System HICAD/3D Principles of Operations (8090-7-034-40) p. 155 issued by Hitachi, Ltd.

In a third prior art, when a certain three-dimensional image has already been displayed, rotating angles for further rotating the three-dimensional image which is being displayed (angles viewed from top and bottom, angles viewed from right and left, angles for rotating clockwise and counterclockwise around an axis which is perpendicular to the image screen and so on) are input from a dial or a keyboard by designating numeric values. This prior art is also described in page 150 of the manual of the second prior art.

In a fourth prior art, one straight line in a displayed configuration is designated as an axis of rotation, and the image is rotated around the axis by a rotating angle designated by one dial.

In a fifth prior art, a display direction of a configuration which is newly displayed is designated using several points, lines or faces in a configuration which is being displayed. For example, when two straight lines which are perpendicular to each other are designated, the configuration is displayed so that the straight line designated at the beginning becomes the horizontal direction of the configuration which is newly displayed and the straight line designated later becomes the vertical direction. (This prior art is described on page 154 in above-mentioned manual, and will be described later with reference to FIG. 17.) Further, when one face and one straight line which is parallel to the face are designated, the configuration is displayed so that the designated face is parallel to the display screen and the designated straight line shows a horizontal direction.

In a sixth prior art, when one sphere is displayed and one point on the sphere is designated, a body is displayed with a vector connecting the point and the center of the sphere to determine direction.

As other prior arts reference, JP-A-1-305475 and JP-A-61-46565 may be mentioned as being relevant.

Figure 17A:
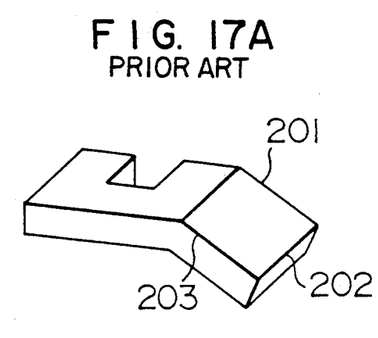
FIGS. 17A, 17B, 17C and 17D are explanatory views for explaining designation of display directions in a conventional method.
Figure 17B:
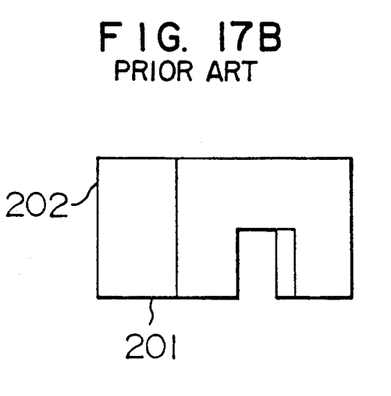
Figure 17C:
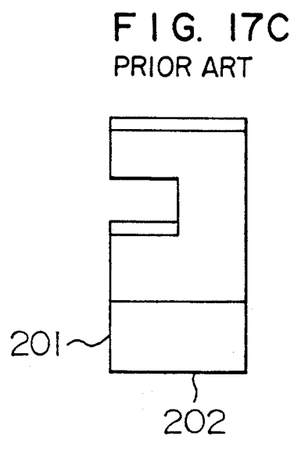
Figure 17D:
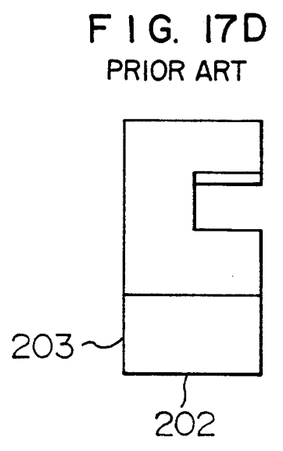

According to the prior arts described above, it is possible to display a three-dimensional image when a design object is viewed from an optional direction. For example, in the above-described fifth prior art, an operator designates a straight line 201 on a right side surface and a straight line 202 on a bottom surface one after another as seen on the design object shown in FIG. 17A which are seen from various directions and are displayed on the image screen. Accordingly, the design object is displayed so that the straight line 201 lies in a horizontal direction and the straight line 202 lies in a vertical direction on the left side of the image screen as shown in FIG. 17B. Also, when the operator designates the straight line 202 and the straight line 201 in successive order, the display is made so that the straight line 202 lies in a horizontal direction and the straight line 201 lies in a vertical direction as shown in FIG. 17C. Furthermore, when the operator designates a straight line 202 and a straight line 203, display is made so that the straight line 202 lies in a horizontal direction as shown in FIG. 17D.

It is possible for an operator to designate the display direction of a design object optionally as described above, but questions arise regarding accuracy and ease of the designating operation. In respective prior arts described above, no consideration has been given to ease of the designating operation, thus the operation remains complex and inconvenient. For example, when it is desired to look at the image shown in FIG. 17C, the operator has to determine which two straight lines are to be designated in FIG. 17A and how the designating order should be, by picturing in the operator's brain, the displayed image in FIG. 17C in a three-dimensional coordinate system to oneself in advance. With such a method, the operator has to repeat trials and errors until an objective image is obtained. The same applies to other prior arts, and furthermore, only an image in a predetermined direction can be seen and a display direction has to be designated with numeric values, thus requiring operating sense which is different from design intentions of the designer.

SUMMARY OF THE INVENTION

It is an object of the present invention to provide an image display method and an image display system which are capable of designating a display perspective of a design object with operating sense which conforms with design intentions of a designer.

The above-mentioned object may be achieved by rotating a three-dimensional image for display by an angle predetermined with respect to a relative positional relationship, based on the relative positional relationship between the three-dimensional image displayed on an image screen and an optional position on the image screen which is designated by an operator.

The above-mentioned object may also be achieved by displaying an image which is obtained by rotating the three-dimensional image by 90 degrees around a line orthogonal to a line connecting a center position of a three-dimensional image displayed on an image screen with an optional position on the image screen which is designated by an operator.

The above-mentioned object may also be achieved, when an operator designates one of a plurality of lines which compose a three-dimensional image displayed on an image screen and a region on the image screen partitioned by the line, by displaying an image obtained by rotating the above-mentioned three-dimensional image by an angle predetermined toward the region side around a line related to the designation o a tangential line with respect to the line.

The above-mentioned object may also be achieved, when a cutting plane line and a visual point on an image screen are designated with respect to a three-dimensional image displayed on the image screen, by displaying a sectional view of the three-dimensional image when the cutting plane line side is seen from the viewing point.

The above-mentioned object may be achieved, when an operator designates an optional point on an image screen with respect to a three-dimensional image displayed on the image screen, by displaying a perspective view of the three-dimensional image with a line connecting the center of the three-dimensional image with the above-mentioned point as the perspective direction.

The above-mentioned object may also be achieved, when a front view of a three-dimensional image is displayed on an image screen, by displaying a right side view of the three-dimensional image when an operator designates the right side of the three-dimensional image on the image screen, by displaying a left side view of the three-dimensional image when the operator designates the left side of the three-dimensional image on the image screen, by displaying a top view of the three-dimensional image when the operator designates the upper side of the three-dimensional image on the image screen, and by displaying a bottom view of the three-dimensional image when the operator designates the lower side of the three-dimensional image on the image screen.

According to the present invention, a perspective view of the image to be displayed next is determined from a relative position of the designated point with respect to a design object which has been already displayed by designating optional points and so forth on an image screen by an operator. Therefore, the present system is convenient to use, and an operating method conforming to original design intentions of a designer is obtained.

Other objects and other features of the present invention will be apparent from the description of embodiments stated hereunder.

DESCRIPTION OF THE PREFERRED EMBODIMENTS

Embodiments of the present invention will be described hereafter in conjunction with the accompanying drawings.

Figure 4:
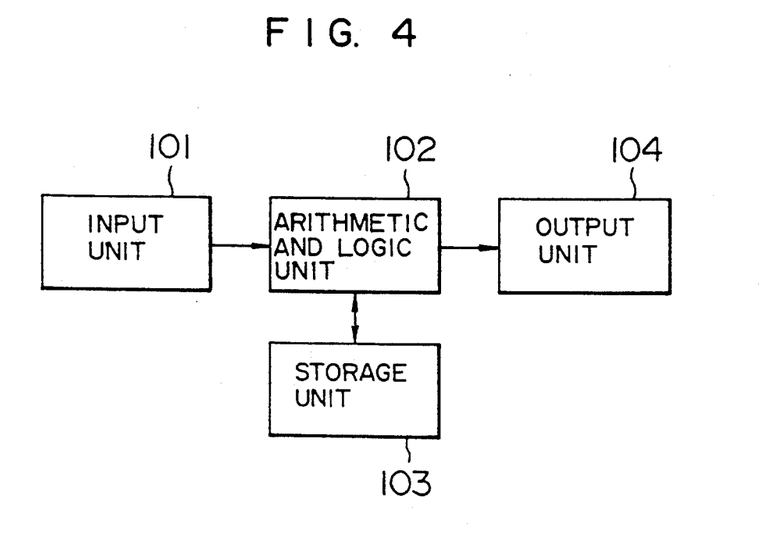
FIG. 4 is a block diagram of an image display system.

FIG. 4 is a block diagram of an image display system according to an embodiment of the present invention. This image display system includes an input unit 101 such as a keyboard or a pointing device e.g. a mouse, an arithmetic and logic unit 102 which executes an arithmetic or logical processing in accordance with a predetermined program, a storage unit 103 for storing data and an output unit 104 such as a CRT and a LCD. Commands for operating the image display system, configuring data of a design object and the like are input from the input unit 101, and the arithmetic and logic unit 102 obtains a display perspective by analyzing input operation commands and obtains shape or configuration data for display by executing geometric computation of configuration data and so forth. Variety of configuration data defined in the world coordinate system are stored in advance in the storage unit 103, and the arithmetic and logic unit 102 reads these configuration data and executes geometric computation on the world coordinate system according to necessity, to thereby convert the configuration data for display thus obtained into a display coordinate system so as to determine the display configuration, and displays those data on a CRT 104 as a three-dimensional image.

Figure 5:
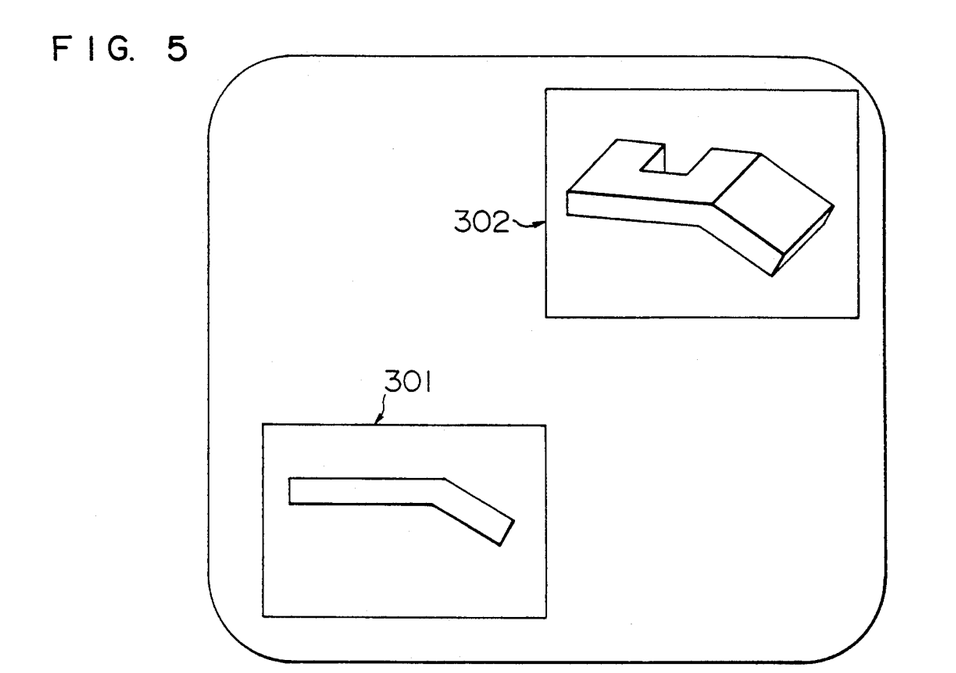
FIG. 5 and FIG. 6 are explanatory views for explaining the view display in the image display system shown in FIG. 4.
Figure 6:
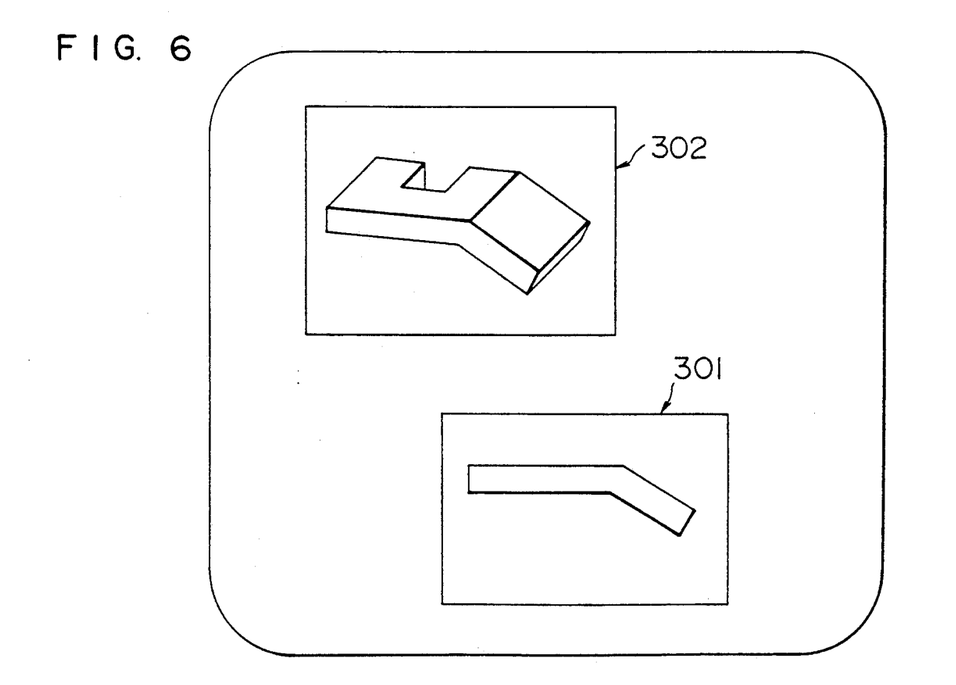

FIG. 5 shows an example of a display image having a three-dimensional configuration as in the image display system shown in FIG. 4. There is a view 301 in which one three-dimensional configuration of an object is seen from the front and a view 302 in which the configuration is seen obliquely from above. The display perspective and the display contents of respective views 301 and 302 have no relation to the display positions of the views in general. Accordingly, even if the display positions of respective views 301 and 302 are placed at positions shown in FIG. 6, the display direction and the display contents in respective views 301 and 302 do not change at all.

Figure 1:
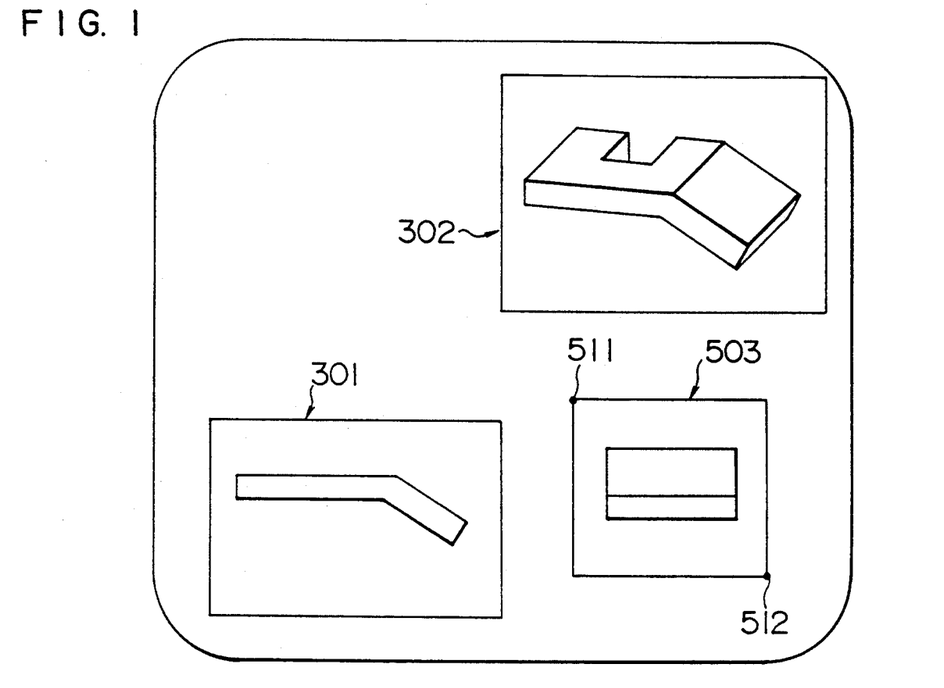
FIG. 1 is an explanatory view for explaining a method of drawing up a right side view according to a first embodiment of the present invention.

Now, it is assumed that it is desired to display a right side view of a three-dimensional configuration the front view of which is shown in the view 301. In the present embodiment, when an operator designates an optional position on an image screen, a relative positional relationship of this designated position with respect to the view 301 is obtained by the arithmetic and logic unit 102, thus determining which of a right side view, a left side view, a top view and a bottom view is desired by the operator. Since the operator desires the right side view of the view 301 in this case, the view 301 is designated first in order to show that the view 301 is the object to be optioned, and then an optional point in the right side region of the view 301 is designated. For example, when it is desired to designate the size of the right side view at the same time, a left upper corner point 511 and a right lower corner point 512 of a view 503 which is to be displayed newly are designated as shown in FIG. 1. With this, the arithmetic and logic unit 102 obtains configuration data of the objective right side view by geometric computation and the like, from configuration data in the world coordinate system, to display them. The position of the optional point may be substituted by the center of the new perspective view to thereby eliminate inputting of the optional point. Description of such a case follows.

Figure 2:
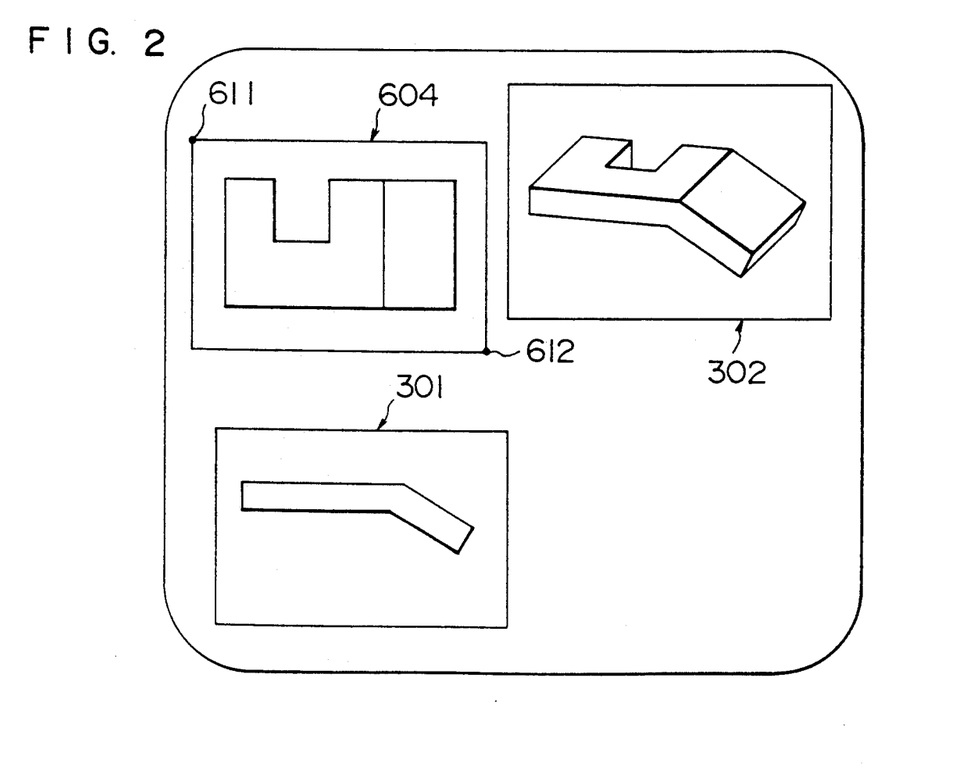
FIG. 2 is an explanatory view for explaining a method of drawing up a top view according to a first embodiment of the present invention.

FIG. 2 shows an example showing a top view of a three-dimensional configuration. In this case, the view 301 is designated first, and then a position 611 and a position 612 are designated in a similar manner as above, to thereby display a perspective 604 of the top view.

Figure 3:
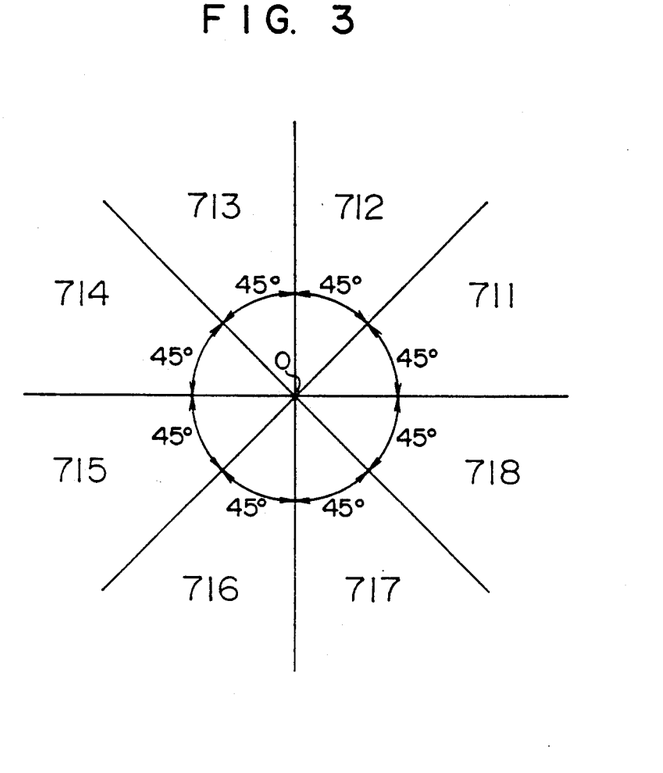
FIG. 3 is an explanatory view for determining a display direction of a new view.

FIG. 3 is an explanatory view when a display direction of a newly formed perspective view is determined by the arithmetic and logic unit 102. A view is given by dividing the image screen at intervals of 45 degrees into regions 711 thru 718 with the center of an objective view (the view 301 in the example shown in FIG. 1) as O. Then, when the center position (the center between the left upper corner point and the right lower corner point) of the new view falls within the region 711 or the region 718, a view which is seen from the right side relatively is formed, and when the center position of the new view falls within the region 712 or the region 713, a view which is seen from above relatively is formed. Further, when the center position of the new view falls within the region 714 or the region 715, a view which is seen from the left side relatively is formed, and when the center position falls within the region 716 or the region 717, a view which is seen from the lower side relatively is formed. Such determination of the display direction is in accordance with a third angle projection method of drafting regulations, and the directions spear to be which is familiar to a designer. Incidentally, a case in which the image screen is divided into four equal parts has been described with reference to FIG. 3, but the present invention is not limited thereto. For example, display directions such as an obliquely right upward direction or an obliquely left downward direction may be designated by increasing the number of divisions. It may also be arranged so that a line connecting a center position of a new view with a center position of an objective view is adopted as a display direction instead of dividing an image screen, and a new view which is obtained by rotating the view by a predetermined angle, e.g., 90 degrees, around a line orthogonal to the above-mentioned line is formed.

In the embodiment described above a region displayed with a rectangle is called a view and the center position is adopted as a reference, but the center of the view and the center of a shape or configuration displayed in the view are different from each other. Thus, computation and display are made so that, for example, the mean value of the maximum coordinate value and the minimum coordinate value of configuration data defined in the world coordinate system is coincident with the center position of the view. Besides, any method of computing the center position of a displayed configuration may be employed. For example, a position of the origin of the world coordinate system may be adopted as the center position of the view.

Next, processing procedures of the arithmetic and logic unit wherein the display direction is determined by dividing the image screen into four regions as explained with reference to FIG. 3 will be described in accordance with a flow chart shown in FIG. 7.

First, an input of a coordinate point $P_0$ showing a reference (objective) view is received (step 1). The coordinate values of the point $P_0$ are expressed with a coordinate system having directions X toward the right on the image screen, Y toward the upside of the screen and Z pointing "out" of the screen. Since it is impossible to indicate a value in a direction perpendicular to the image screen with an input by a general pointing device such as a mouse or a tablet, the Z value is determined to "0".

Next, a view including the above-mentioned point $P_0$ in a view is retrieved among those views which are displayed on the image screen, and is named as a view $V_0$. When a plurality of views are displayed being overlapped with one another and the point $P_0$ is located in the overlapped portion, an uppermost view in which a configuration is displayed practically is adopted as the view $V_0$ (step 2).

Figure 8:
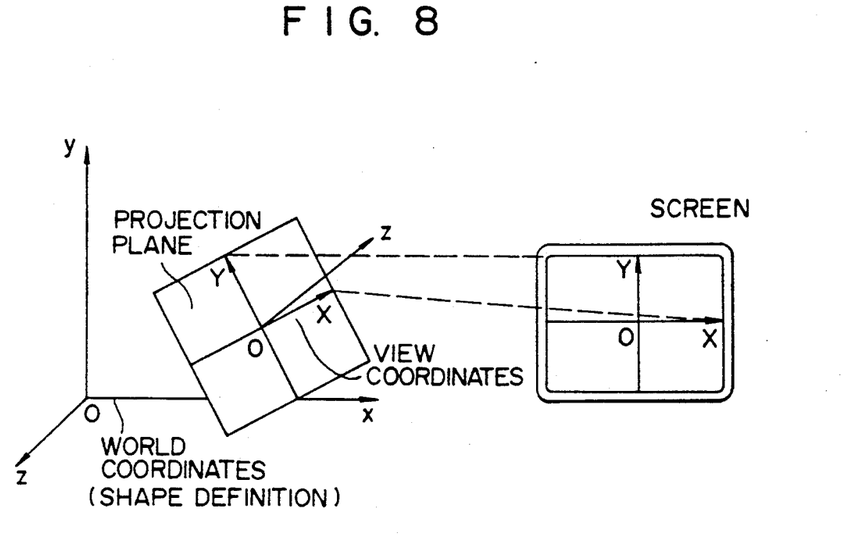
FIG. 8 shows the relationship between a world coordinate system and a view coordinate system.

When a reference view is specified to be the view $V_0$, information in the display direction of the three-dimensional configuration displayed by the view among the information of the view $V_0$ is taken out of the storage unit (step 3). There are a variety of display methods for the display direction of the view $V_0$, but the display direction is expressed with an origin and directions of axis of coordinates of the view coordinate system on the world coordinate system. For example, as shown in FIG. 8, such an information that the view displayed on the screen has the center O, and a right direction of a view (the right direction of the screen is the same) displayed on the screen is the X-axis direction, an upward direction of the view (the upward direction of the screen is the same) is the Y-axis direction, and "outward" direction of the view (this side direction of the screen is the same) is the Z-axis direction becomes the information for the display direction. Thus, in the image display system of the present embodiment, a center coordinate of the view coordinate system, a vector in the right direction, a vector in the upward direction and a vector in this "outward" direction in the world coordinate system are taken out in the step 3.

In a next step 4, inputs of diagonal points $P_1$ and $P_2$ which express a position and a size of a newly formed view are received. These two points $P_1$ and $P_2$ are also expressed with the coordinate system on the screen. When these two points $P_1$ and $P_2$ are input, a middle point $P_{12}$ thereof is computed in a next step 5. This middle point $P_{12}$ becomes a point which corresponds to the center of the newly formed view, which is adopted as a center position $P_{00}$ of the reference view $V_0$ (step 6).

Next, the display direction of a configuration displayed in the newly formed view is determined from the relative positional relationship between the center position $P_{12}$ of the newly formed view and the center position $P_{00}$ of the reference view $V_0$. First, it is judged whether the point $P_{12}$ is located on the right side of the point $P_{00}$ or not (step 7). When it is located on the right side, processing is advanced to a step 8, and an OX'Y'Z' coordinate system which has been obtained by rotating the OXYZ coordinate system by 90 degrees around the Y-axis is computed. As a result, the origin O and the Y-axis direction are not changed, the Z-axis direction takes the original X-axis direction, and the X-axis direction takes a direction opposite to that of the original Z-axis. Accordingly, the three-dimensional configuration displayed in the new view shows a shape in which the configuration displayed in the reference view $V_0$ is seen from the right side.

In case the judgement in the step 7 shows a negative result, processing is advanced to a next step 9, and it is judged whether the point $P_{12}$ is located on the upper side of the point $P_{00}$ nor not. When it is located on the upper side, processing is advanced to a step 10, and the OX'Y'Z' coordinate system obtained by rotating the OXYZ coordinate system by $-90$ degrees around the X-axis is computed. As a result, the three-dimensional configuration displayed in the new view shows a shape in which the configuration displayed in the reference view $V_0$ is seen from above.

In case the judgement in the step 9 shows a negative result, processing is advanced to a next step 11, and it is judged whether the point $P_{12}$ is located on the left side of the point $P_{00}$ or not. When it is located on the left side, processing is advanced to a step 12, and the OX'Y'Z' coordinate system obtained by rotating the OXYZ coordinate system by $-90$ degrees around the Y-axis is computed. As a result, the three-dimensional configuration displayed in the new view shows a shape in which the configuration displayed in the reference view $V_0$ is seen from the left side.

In case the judgement in the step 11 shows a negative result, in other words, when the point $P_{12}$ is located on the lower side of the point $P_{00}$, processing is advanced from the step 11 to a step 13, and the OX'Y'Z' coordinate system obtained by rotating the OXYZ coordinate system by 90 degrees around the X-axis is computed. As a result, the three-dimensional configuration displayed in the new view shows a shape in which the configuration shown in the reference view $V_0$ is seen from below.

After the steps 8, 10, 12 and 13, processing is advanced to a step 14, and a new view $V_1$ is formed practically and the position and the size on the image screen are set to the new view $V_1$ in the form of diagonal points $P_1$ and $P_2$ (step 15). In a next step 16, the display direction is set in the form of the OX'Y'Z' coordinate system, and the new view $V_1$ is finally displayed (step 17).

Incidentally, it has been described that the configuration of a view is a rectangle in the above-mentioned embodiment, but the present invention is not limited to the configuration of the view, and either a circle or a triangle or an optional configuration designated by a user may be employed. In case of an optional configuration, the center of the view is positioned at a geometrical center of gravity or at a center position of the top and bottom ends and the right and left ends. Furthermore, display directions of a new view have been described to be four directions, right above, right side, left side and right under. However, in case other drafting regulations are applied, other directions may be adopted as described previously.

Figure 9:
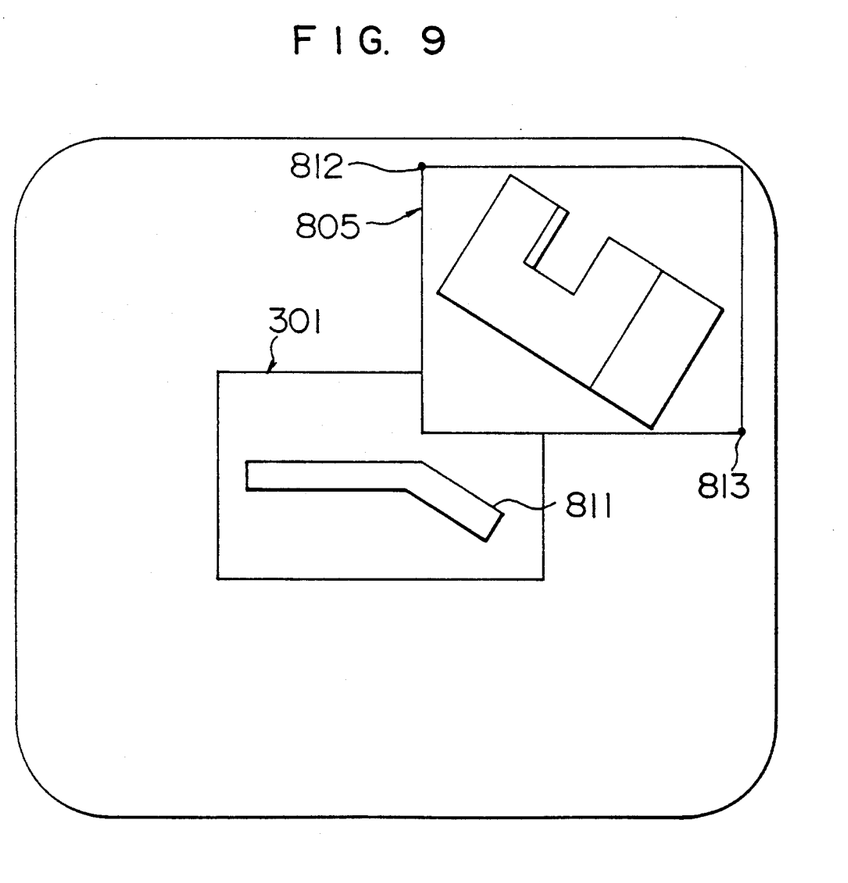
FIG. 9 to FIG. 12 are explanatory views for explaining a view drawing-up method according to a second embodiment of the present invention.

Next, another embodiment of the present invention will be described. It happens sometimes that a design engineer desires to display a configuration which is seen from a perpendicular direction with respect to one straight line 811 which composes the configuration displayed in the existing view 301 as a view 805 as shown in FIG. 9. This view 805 is a perspective view which can be seen when the configuration displayed in the view 301 is rotated by 90 degrees around the straight line 811. In the present embodiment, this straight line 811 is designated, and then points 812 and 813 showing the display position and the size of the new view 805 are designated, thereby to display the view 805. In a conventional case, a rotating direction has to be designated with numeric values, etc. in addition to designating the straight line 811, which has been troublesome. In the present embodiment, however, a view which has been rotated is obtainable only by designating the points 812 and 813. That is, the rotating direction is determined depending on the side of the region where the center position of the new view is located with the straight line 811 (a straight line 911 extended therefrom) as the border. When the center position of the new view is located in the region on the upper side with respect to the straight line 811, a configuration which is seen from above perpendicularly with respect to the straight line 811 is displayed as the view 805, and, when the center position of the new view is located in the region on the lower side, a configuration which is seen from below perpendicularly with respect to the straight line 811 is displayed as a view 906. Since this display direction is also a direction based upon drafting regulations, this is a method of determining the direction which is familiar to a designer. Naturally, it is also possible to judge the rotating direction from the relative positional relationship of respective center positions of an existing view and a new view.

Figure 11:
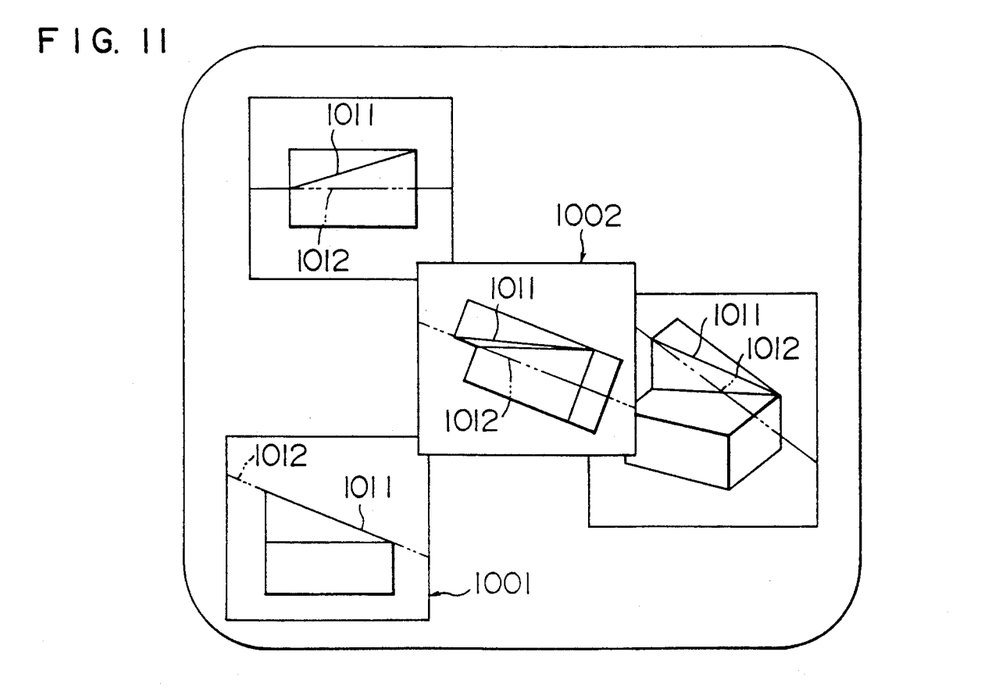

The straight line 811 shown in FIG. 9 is a line parallel to the image screen, but it is an oblique line sometimes as a line on a practical three-dimensional configuration. In such a case, an unexpected configuration is displayed if the line is adopted as the axis of rotation. Therefore, when a view 1002 seen from a direction perpendicular to a straight line 1011 of a reference view 1001 is formed, as shown in FIG. 11 for instance, display is made in a direction rotated by 90 degrees around a straight line 1012 obtained by projecting the straight line 1011 onto a plane parallel to the view 1001. Because the straight line 1011 is the straight line 1011 shown in the view 1002 three-dimensionally, and is not parallel to the image screen in the view 1001.

Next, view forming procedures described above will be explained in accordance with a flow chart shown in FIG. 13 while referring to FIG. 12.

First, an input of a coordinate point $P_0$ is received (step 21). Next, a reference view $V_0$ containing the point $P_0$ is retrieved (step 22). Then, when the reference view $V_0$ is specified, information of the reference view $V_0$ is taken out (step 23). Up to this step, processing is the same as the steps 1 to 3 shown in the flow chart in FIG. 7. Here, the difference exists in that an operator inputs the point $P_0$ as pointing a straight line which becomes an axis of rotation in the reference view.

In a next step 24, a line segment $L_0$ which is closest to the point $P_0$ among straight lines composing a configuration displayed in the reference view $V_0$ is retrieved. Then, coordinates $P_{01}$ and $P_{02}$ are computed when coordinate positions of both end points of the line segment $L_0$ are projected on the screen of the reference view $V_0$ (step 25). Then, the difference in a depth direction on the screen (namely, in the direction of the OZ axis in FIG. 8) is disregarded. In other words, the straight line 1012 obtained by projecting the line 1011 on the image screen is obtained instead of the line 1011 shown in FIG. 11.

Next, inputs of diagonal points $P_1$ and $P_2$ which show the position and the size of a view $V_1$ to be newly formed are received (step 26). Then a middle point $P_{12}$ between the points $P_1$ and $P_2$ is computed (step 27). These steps are same as the steps 4 and 5 shown in FIG. 7.

In order to judge the direction for rotating a configuration to be displayed in a new view $V_1$ with respect to the configuration displayed in the reference view $V_0$, it is necessary to know on which side of the straight line $L_0$ the middle point $P_{12}$ is located. Thus, a factor k used for such judgement is computed first (step 28). This computation method will be explained with reference to FIG. 12.

Figure 12:
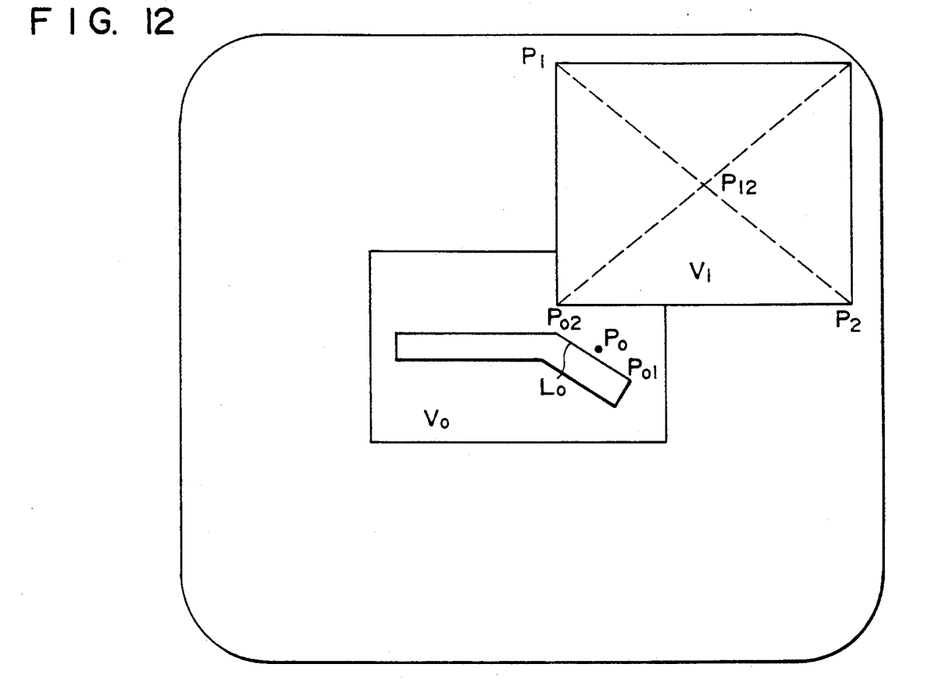

Two vectors are considered in the coordinate system on the image screen shown in FIG. 12. A first vector is a vector which starts from an end point $P_{01}$ of the line segment $L_0$ for a center point $P_{12}$ of a new view $V_1$, and a second vector is a vector which starts from the end point $P_{01}$ for an end point $P_{02}$. When a vector product of the first vector and the second vector is computed, a vector product which is perpendicular to both the first and second vectors is obtained. When it is assumed that the line segment 811 is the designated line $L_0$ in FIG. 10, this vector product appears as a vector toward the "outward" side of the image when the new view is located at a position of a view 805, and appears as a vector toward the depth direction in the image when the new view is located at a position of a view 906. Here, a third component of this vector product vector, viz., the component in Z-axis direction is adopted as the factor k.

Figure 13:
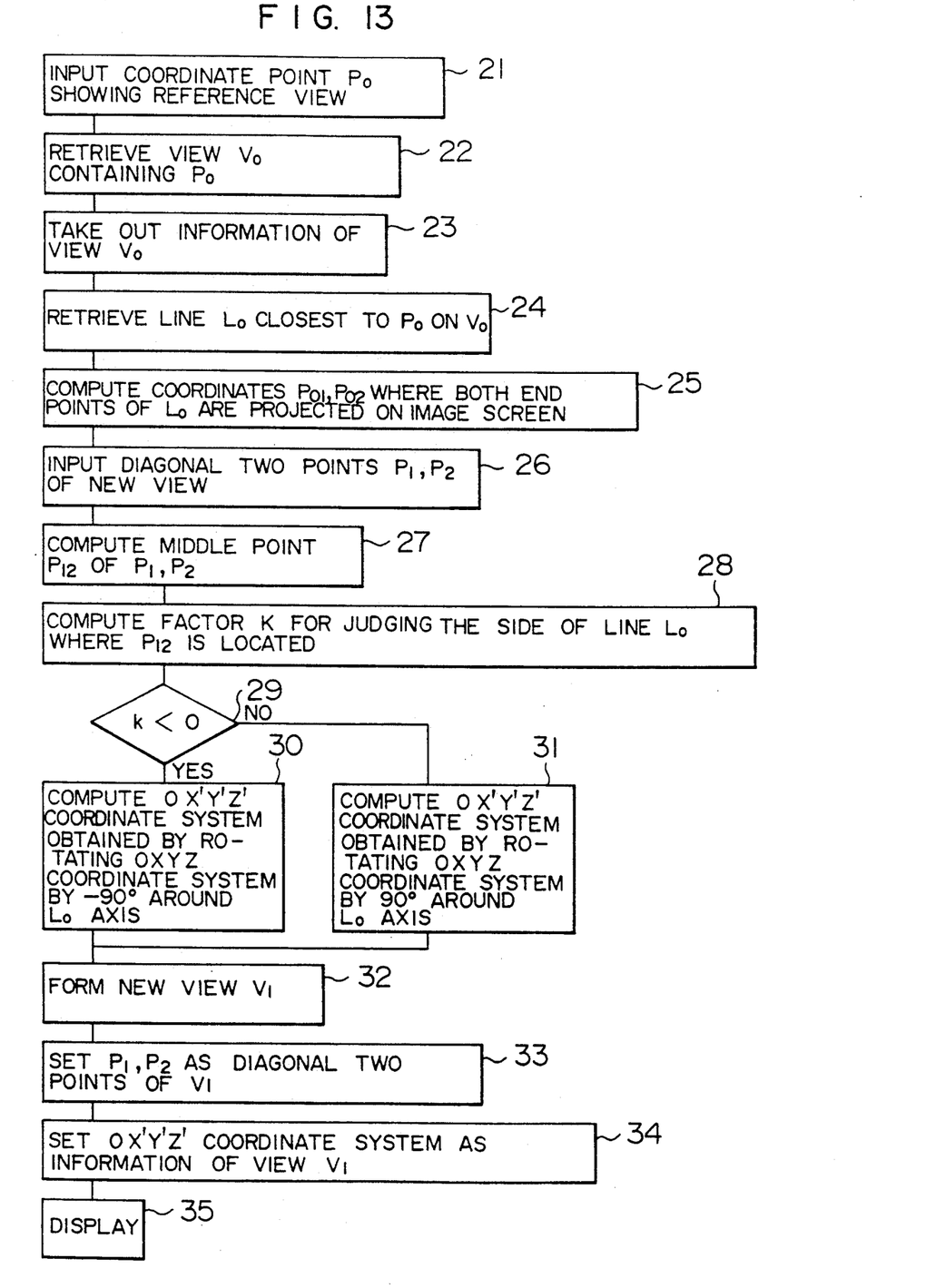
FIG. 13 is a flow chart showing view drawing-up procedures in the second embodiment.

In a step 29 shown in FIG. 13, it is judged whether the value of this factor k is smaller than "0" or not. When the result of judgement is positive, that is, when $k<0$ is satisfied, processing is advanced to a step 30, and an OX'Y'Z' coordinate system obtained by rotating a view coordinate system (OXYZ coordinate system) in the world coordinate system by $-90$ degrees around the axis $L_0$ is computed. With this, the view 906 is obtained in the example shown in FIG. 11.

When the result of the judgement in step 29 is negative, that is, when it shows $k>0$, processing is advanced to a step 31, and an OX'Y'Z' coordinate system obtained by rotating the view coordinate system (OXYZ coordinate system) in the world coordinate system by $+90$ degrees around the axis $L_0$ is computed. With this, the view 805 is obtained in the example shown in FIG. 11.

Figure 7:
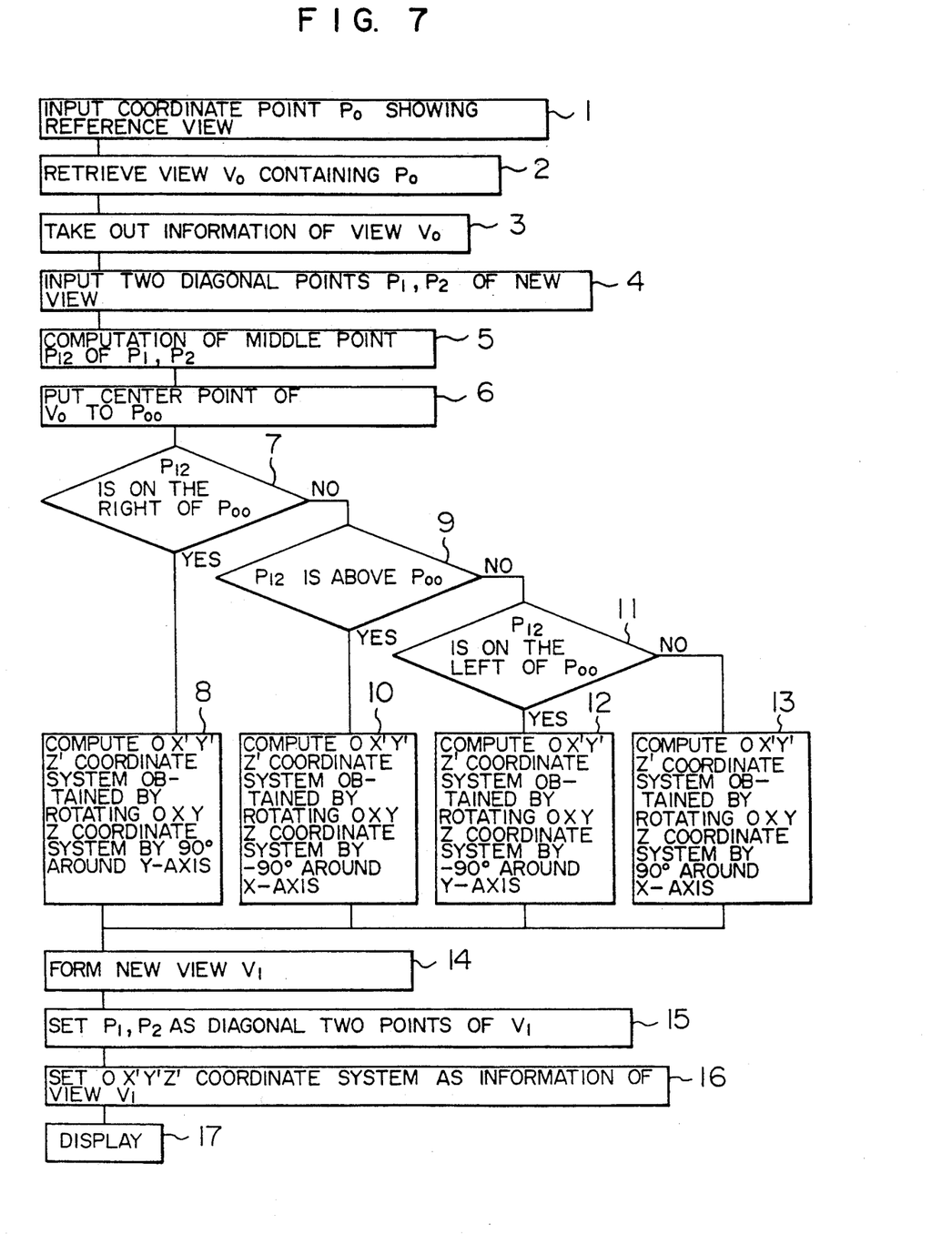
FIG. 7 is a flow chart showing view drawing-up procedures in the first embodiment.

Steps 32, 33, 34 and 35 thereafter are the same as in the steps 14 to 17 shown in FIG. 7.

In the present embodiment, one of the straight lines composing a configuration displayed in the reference view has been adopted as a straight line used for the axis of rotation. However, the present invention is not limited to a straight line. Even when contour lines of three-dimensional circles, cylindrical faces or conical faces show a straight line in the display on the screen, it is possible to adopt them as the axis of rotation. Furthermore, even when the counter lines show a curve in the display on the screen, it is also possible to adopt the tangential line thereof as the axis of rotation.

Figure 14:
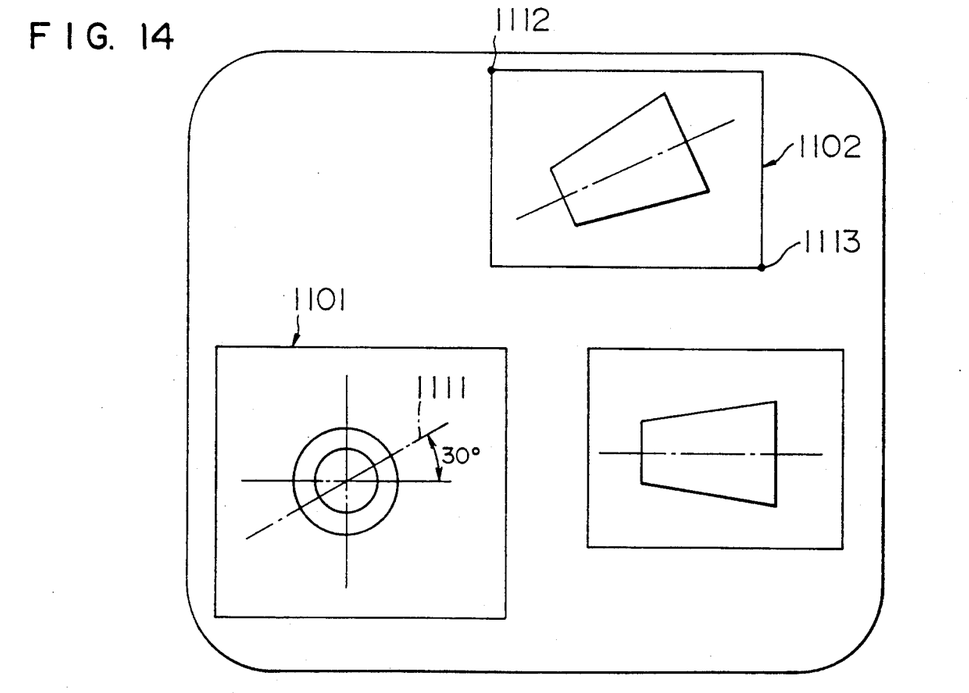
FIG. 14 is an explanatory view for explaining a method of drawing up a perspective view according to a third embodiment of the present invention.

Next, still another embodiment will be described with reference to FIG. 14. In the present embodiment, a perspective view in which a three-dimensional configuration displayed in a reference view is seen from an optional direction is formed. When a view 1101 is a reference view and it is desired to display an image in which this three-dimensional configuration is seen from the direction of a straight line 1111, the arithmetic and logic unit recognizes a designated display direction by designating the straight line 1111 by means of a pointing device, and, when diagonal points 1112 and 1113 which show the display position and the size of a new view 1102 are inputted in the next place, a perspective view thereof is displayed. The straight line 1111 may be formed either by newly inputting two designated points or by utilizing a line which has already been drawn in the reference view. In the example shown in FIG. 14, a perspective view is obtained by designating the line 1111 drawn in the reference view with a mouse. When the straight line 1111 is designated, there are two display directions, but it is determined which direction is to be adopted from the relative positional relationship between the designated position of the straight line 1111 and the center of the view 1102. Here, the view on the right side of the reference view 1101 shown in FIG. 14 is a perspective view obtained by designating a center line in a horizontal direction in the reference view.

Figure 10:
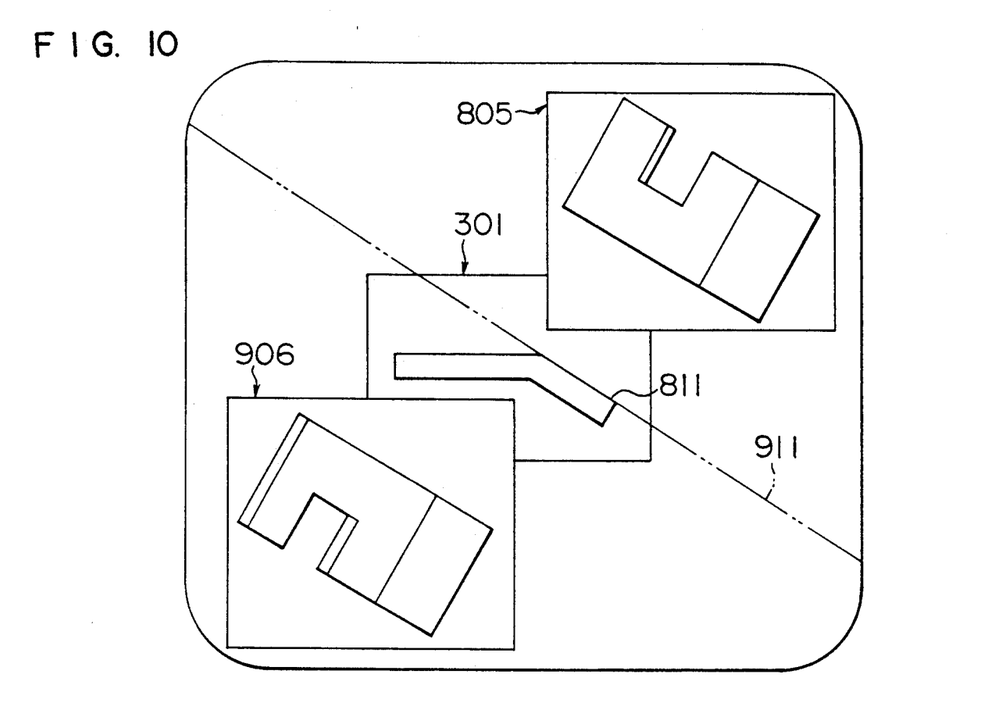

When forming this perspective view, and in the case of the embodiment explained with reference to FIG. 10, the position of the configuration in the new view is not determined. Therefore, the position of the configuration is determined, for example, such that the center of a straight line viewing perpendicularly or a straight line designating the viewing direction coincides with the center of the new view.

Figure 15:
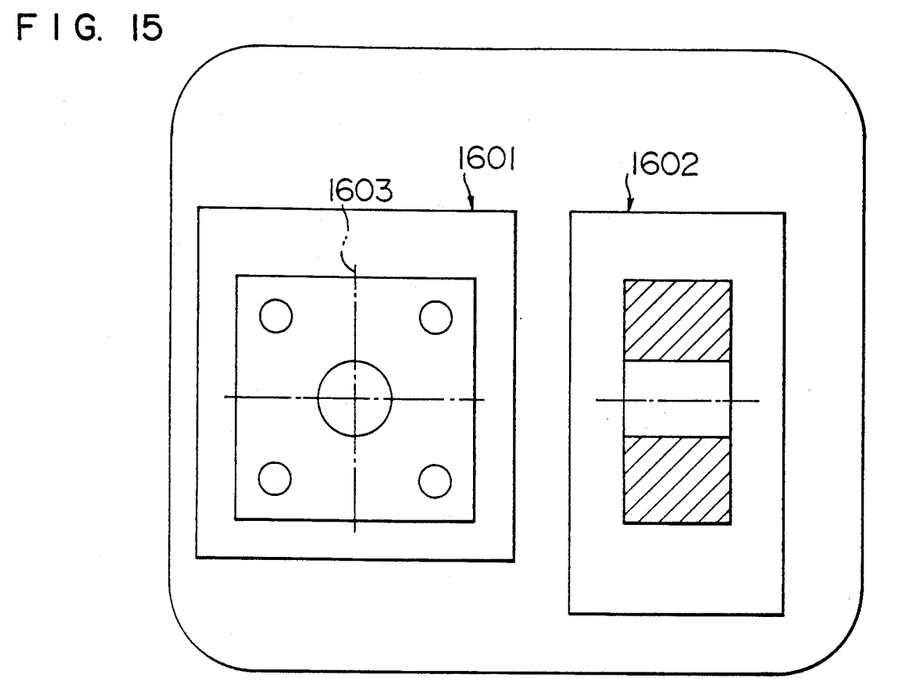
FIG. 15 is an explanatory view for explaining a method of drawing up a sectional view according to a fourth embodiment of the present invention.

Next, still another embodiment will be described with reference to FIG. 15 and FIG. 16. The present embodiment relates to formation of a sectional view of a three-dimensional configuration. A view 1601 in which a front view of a three-dimensional configuration is displayed is adopted as the reference view, and one of lines drawn therein is designated. For example, a center line 1603 in a vertical direction is selected. Further, as shown in FIG. 15 for instance, a display position of a new view 1602 is designated on the right side of the view 1601. With this, the line 1603 is adopted as a cutting plane line, and a sectional view in which this section is seen from the right side is displayed in the new view 1602.

Figure 16:
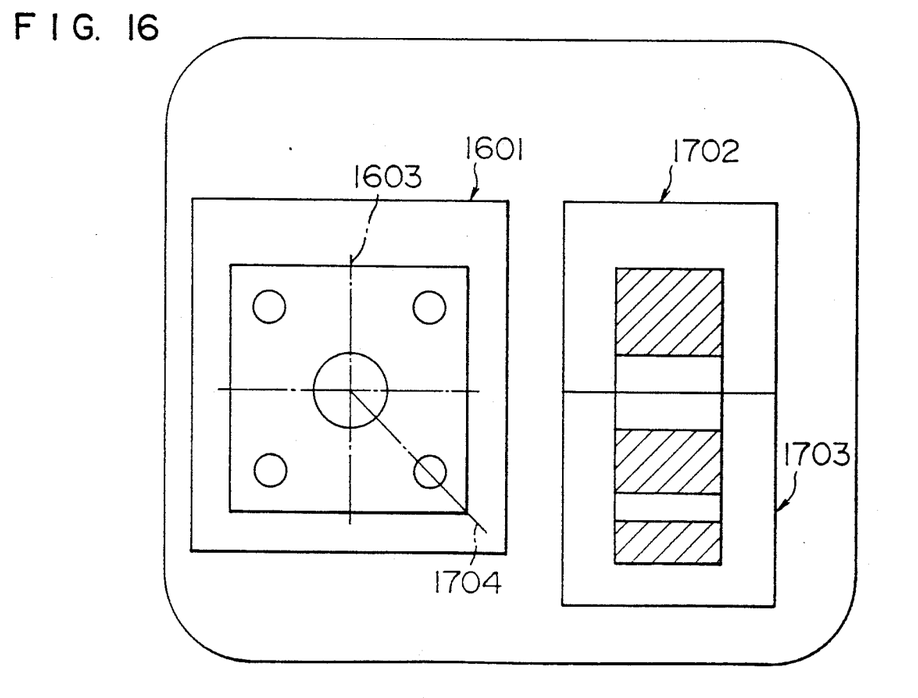
FIG. 16 is an explanatory view for explaining a method of drawing up a sectional view when a kinked line is adopted as a cutting plane line.

In an embodiment shown in FIG. 16, sectional views in case kinked lines 1603 and 1704 are adopted as cutting plane lines are displayed in new views 1702 and 1703. In the present embodiment, a different view is formed for each straight line of cutting plane lines. In case a kinked line composed of such a plurality of straight lines is adopted as a cutting plane line, it is possible to combine sections which are cut with simple planes by forming a separate view for each straight line, thereby to form a composite sectional view easily. In this case, since a plurality of views are related to each other, it is a matter of course to provide means which move respective views while keeping reference to each other when the whole views are moved to a separate location on the image plane. Besides, the kinked line is not limited to a combination of two straight lines, and it is also possible to omit a sectional view which is related to a part of the straight lines which compose the kinked line. Furthermore, it is also possible to have the cutting plane line include a curve such as a circular arc. In the present embodiment, a composite sectional view is formed by combining a plurality of views, however, it is needless to say that all the sectional views may be displayed in one view.

According to the present invention, when configurations in which a three-dimensional configuration such as a design object is seen from various directions are displayed on an image plane, it is possible to designate a display perspective by designating a position on an image screen with a pointing device and the like, thus obtaining an effect that the operation method is simple and the way to use becomes easier.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. For projecting and displaying a three-dimensional model representing a shape of a three-dimensional object on a two-dimensional image screen, a method of determining a viewing perspective for image production comprising the steps of:
    projecting said three-dimensional model, based on a first predetermined viewing perspective to generate a first projected image;
    displaying said first projected image at a predetermined position on said screen;
    designating an arbitrary position on said screen by an operator;
    generating information of a relative positional relationship between the display position of said first projected image on said screen and said designated arbitrary position;
    computing a second viewing perspective which is formed when said first viewing perspective is rotated by a predetermined angle, based on said information of the relative positional relationship;
    projecting said three-dimensional model based on said second viewing perspective to generate a second projected image; and
    displaying said generated second projected image at said designated position on said screen.

2. For projecting and displaying a three-dimensional model representing a shape of a three-dimensional object on a two-dimensional image screen, a method of determining a viewing perspective for image production comprising the steps of:
    projecting said three-dimensional model on a projection plane, based on a first predetermined viewing perspective to generate a first projected image;
    displaying said first projected image at a predetermined position on said screen;
    designating an arbitrary position on said screen by an operator;
    computing a rotating direction perpendicular to a line connecting the display position of said first projected image on said screen and said designated arbitrary position to compute a rotating direction on said projection plane in a three-dimensional space which corresponds to said computed rotating direction on the screen;
    computing a second viewing perspective which is formed when said first viewing perspective is rotated by 90 degrees in said computed rotating direction;
    projecting said three-dimensional model, based on said second viewing perspective to generate a second projected image; and
    displaying said generated second projected image at said designated arbitrary position on said screen.

3. For projecting and displaying a three-dimensional model representing a shape of a three-dimensional object on a two-dimensional image screen, a method of determining a viewing perspective for image production comprising the steps of:
    projecting said three-dimensional model on a projection plane, based on a first predetermined viewing perspective to generate a first projected image;
    displaying said first projected image at a predetermined position on said screen;
    designating one line constructing said first projected image on said screen by an operator;
    designating an arbitrary position on said screen by an operator;
    computing a rotating direction of said designated line, a rotating direction of a tangential line with respect to said designated line or a rotating direction perpendicular to said designated line to compute a rotating direction of said projection plane in a three-dimensional space which corresponds to said computed rotating direction on the screen;
    computing a second viewing perspective which is formed when said first viewing perspective is rotated by 90 degrees in said computed rotating direction
    projecting said three-dimensional model, based on said second viewing perspective to generate a second projected image; and
    displaying said generated second projected image at said designated arbitrary position on said screen.

4. For projecting and displaying a three-dimensional model representing a shape of a three-dimensional object on a two-dimensional image screen, a method of determining a viewing perspective for image production comprising the steps of:
    projecting said three-dimensional model on a projection plane, based on a first predetermined viewing perspective to generate a first projected image;
    displaying said first projected image at a predetermined position on said screen;
    designating one cutting line constructing said first projected image on said screen by an operator;
    designating an arbitrary position on said screen by an operator;
    computing a rotating direction of a projection plane in a three-dimensional space which corresponds to a direction of said cutting line;
    computing a second viewing perspective which is formed when said first viewing perspective is rotated by 90 degrees in said computed rotating direction;
    generating a cutting plane in which a line having the computed rotated direction is extended perpendicularly to said projection plane;

projecting said cutting plane in said three-dimensional model, based on said second viewing perspective to generate a second projected image; and displaying said generated second projected image at said designated arbitrary position on said screen.

5. For projecting and displaying a three-dimensional model representing a shape of a three-dimensional object on a two-dimensional image screen, a method of determining a viewing perspective for image production comprising the steps of:

projecting said three-dimensional model, based on a first predetermined viewing perspective to generate a first projected image;

displaying said first projected image at a predetermined position on said screen;

designating an arbitrary position on said screen by an operator;

computing a rotating direction perpendicular to a line connecting the display position of said first projected image on said screen and said designated position to apply a predetermined rotation processing to said computed rotating direction and to compute another rotating direction on the projection plane in a three-dimensional space which corresponds to said computed rotating direction on the screen subjected to the rotation processing;

computing a second viewing perspective which is formed when said first viewing perspective is rotated by 90 degrees in said computed rotating direction;

projecting said three-dimensional model, based on said second viewing perspective to generate a second projected image; and displaying said generated second projected image at said designated arbitrary position on said screen.

6. In a system for projecting and displaying a three-dimensional model representing a shape of a three-dimensional object on a two-dimensional image screen, a device for determining a viewing perspective for image production comprising the steps of:

first projection means for projecting said three-dimensional model, based on a first predetermined viewing perspective to generate a first projected image;

first display means for displaying said first projected image at a predetermined position on said screen;

position inputting means for inputting an arbitrary position on said screen designated by an operator;

positional relationship generating means for generating information of a relative positional relationship between the display position of said first projected image on said screen and said designated arbitrary position input by said position inputting means;

viewing perspective computing means for computing a second viewing perspective which is formed when said first viewing perspective is rotated by a predetermined angle, based on said information of the relative positional relationship;

second projection means for projecting said three-dimensional model, based on said second viewing perspective to generate a second projected image; and second display means for displaying said generated second projected image at said arbitrary position on said screen input by said position inputting means.

7. In a system for projecting and displaying a three-dimensional model representing a shape of a three-dimensional object on a two-dimensional image screen, a device for determining a viewing perspective for image production comprising:

first projection means for projecting said three-dimensional model on a projection plane, based on a first predetermined viewing perspective to generate a first projected image;

first display means for displaying said first projected image at a predetermined position on said screen;

a position inputting means for inputting an arbitrary position on said screen designated by an operator;

rotating axis direction computing means for computing a rotating direction perpendicular to a line connecting the display position of said first projected image on said screen and said designated arbitrary position input by said position inputting means to compute a rotating direction on the projection plane in a three-dimensional space which corresponds to said computed rotating direction on the screen;

viewing perspective computing means for computing a second viewing perspective which is formed when said first viewing perspective is rotated by 90 degrees in said computed rotating direction computed by said rotating axis direction computing means;

second projection means for projecting said three-dimensional model, based on said second viewing perspective to generate a second projected image; and second display means for displaying said generated second projected image at said designated arbitrary position on said screen input by said position inputting means.

8. In a system for projecting and displaying a three-dimensional model representing a shape of a three-dimensional object on a two-dimensional image screen, a device for determining a viewing perspective for image production comprising:

first projection means for projecting said three-dimensional model on a projection plane, based on a first predetermined viewing perspective to generate a first projected image;

first display means for displaying said first projected image at a predetermined position on said screen;

line inputting means for inputting one line constructing said first projected image which is designated by an operator;

position inputting means for inputting an arbitrary position on said screen which is designated by an operator;

rotating axis direction computing means for computing a rotating direction of said line input by said line inputting means, a rotating direction of a tangential line with respect to said designated line or a rotating direction perpendicular to said designated line to compute a direction of the projection plane in a three-dimensional space which corresponds to said computed rotating direction on the screen;

viewing perspective computing means for computing a second viewing perspective which is formed when said first viewing perspective is rotated by 90 degrees in said computed rotating direction computed by said rotating axis computing means;

second projection means for projecting said three-dimensional model, based on said second viewing perspective to generate a second projected image; and second display means for displaying said generated second projected image at said arbitrary position on said screen input by said position inputting means.

9. In a system for projecting and displaying a three-dimensional model representing a shape of a three-dimensional object on a two-dimensional image screen, a device for determining a viewing perspective for image production comprising:

first projection means for projecting said three-dimensional model on a projection plane, based on a first predetermined viewing perspective to generate a first projected image;

first display means for displaying said first projected image at a predetermined position on said screen;

cutting line inputting means for inputting one cutting line constructing said first projected image on said screen which is designated by an operator;

position inputting means for inputting an arbitrary position on said screen which is designated by an operator;

rotating axis direction computing means for computing a rotating direction of a projection plane in a three-dimensional space which corresponds to a rotating direction of said cutting line;

viewing perspective computing means for computing a second viewing perspective which is formed when said first viewing perspective is rotated by 90 degrees in said computed rotating direction computed by said rotating axis direction computing means;

cutting plane generation means for generating a cutting plane in which a line having the computed rotating direction computed by said rotating axis direction computing means is extended perpendicularly to the projection plane;

second projecting means for projecting said cutting plane in said three-dimensional model, based on said second viewing perspective to generate a second projected image; and second display means for displaying said generated second projected image at said arbitrary position on said screen input by said position inputting means.

10. In a system for projecting and displaying a three-dimensional model representing a shape of a three-dimensional object on a two-dimensional image screen, a device for determining a viewing perspective for image production comprising:

first projection means for projecting said three-dimensional model on a projection plane, based on a first predetermined viewing perspective to generate a first projected image;

first display means for displaying said first projected image at a predetermined position on said screen;

position inputting means for inputting an arbitrary position on said screen designated by an operator;

rotating axis direction computing means for computing a rotating direction perpendicular to a line connecting the display position of said first projected image on said screen and said position on said screen input by said position inputting means to apply a predetermined rotation processing to said computed rotating direction and to compute a rotating direction on the projection plane in a three-dimensional space which corresponds to said rotating direction on the screen subjected to the rotation processing;

viewing perspective computing means for computing a second viewing perspective which is formed when said first viewing perspective is rotated by 90 degrees in said computed rotating direction computed by said rotating axis direction computing means;

second projection means for projecting said three-dimensional model, based on said second viewing perspective to generate a second projected image; and second display means for displaying said generated second projected image at said arbitrary position on said screen input by said position inputting means.

* * * * *